(No Model.)
J. S. BULKELEY.
SHOE HORN AND BUTTONER.
No. 267,145. Patented Nov. 7, 1882.
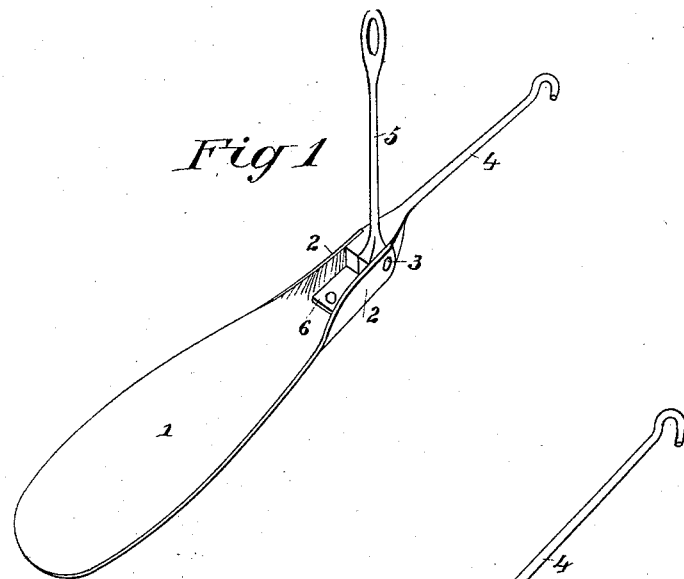
Fig 1.
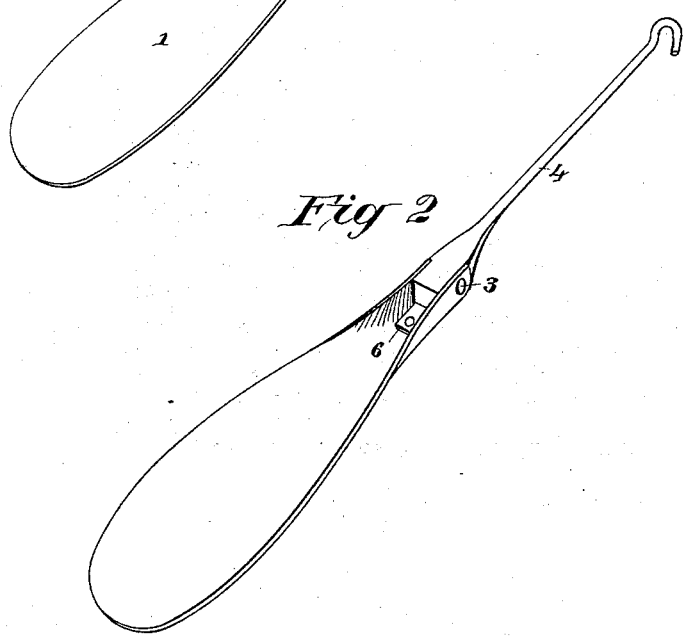
Fig 2.
Fig 3.
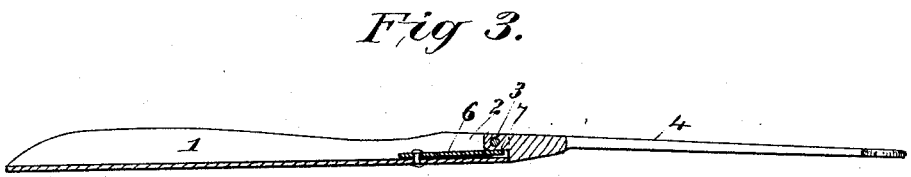
Attest:
Geo. T. Smallwood Jr.
Harry E. Knight
Inventor:
John S. Bulkeley
By Knight Bros
Attys

UNITED STATES PATENT OFFICE.

JOHN S. BULKELEY, OF BALLSTON SPA, ASSIGNOR OF ONE-HALF TO CORA E. LUCAS, OF SARATOGA SPRINGS, NEW YORK.

SHOE HORN AND BUTTONER.

SPECIFICATION forming part of Letters Patent No. 267,145, dated November 7, 1882.

Application filed June 12, 1882. (No model.)

*To all whom it may concern:*

Be it known that I, JOHN S. BULKELEY, a citizen of the United States, residing at Ballston Spa, Saratoga county, in the State of New York, have invented Improvements in a Combined Shoe Horn and Buttoner, of which the following is a specification.

My invention has for its object to so combine a shoe-horn and one or more buttoning devices that they shall be readily foldable for insertion into the pocket.

To this end my improvement consists in forming the shoe-horn with projecting flanges, to which I hinge one or more shoe or glove buttoners. To hold the buttoner to open or closed position, I employ a spring on the horn which bears on cam-surfaces on the hinged end of the buttoner, as hereinafter described.

In order that my invention may be fully understood, I will proceed to describe it with reference to the accompanying drawings, in which—

Figure 1 is a view of the preferred form of my invention, in which a shoe-button hook and a glove-fastener are hinged to one end of a shoe-horn, the button-hook being shown completely open and the glove-buttoner only half opened. Fig. 2 is a view representing the combination, with the shoe-horn, of a single button-hook. Fig. 3 is a longitudinal section of the same.

1 represents a shoe-horn of suitable form, contracted at one end and having its edges bent inward, so as to form flanges 2 2. Between these flanges is hinged, by pin 3 or otherwise, a button-hook, 4, and in one form of my invention a glove-buttoner, 5. A spring or springs, 6, bearing on the notched or flattened portions 7 of the hook or hooks, like the spring of a knife-blade, serves to hold the same to an open or a closed position.

It will be readily seen that the arrangement here shown is such as to enable the ready opening of the parts when either the horn or buttoner is to be used, and the equally ready refolding of them together for convenient carriage in the pocket. The parts are so jointed as that when open the hook is thrown back not to a straight line with the horn, but so as to form a slight angle, thus throwing the hook completely out of the way when it is desired to use the horn. In using the implement the horn is grasped from its convex side while being used as a handle for the hook. By this means the horn comes up into the palm of the hand, and enables free action in using the hook, and a good purchase on the hook by pressing it against the shoulder on the horn and rendering it stiffer.

Although I have here shown merely a button-hook and a glove-buttoner in combination with a shoe-horn, I would have it understood that I do not limit myself to the precise combinations shown, as instead of a single button-hook I may use a single glove-buttoner, or two or more of said hooks or buttoners, in any desired combination.

Having thus described my invention, the following is what I claim as new therein and desire to secure by Letters Patent:

1. A shoe-horn provided at one end with projections, to which is pivoted or hinged one or more buttoning devices adapted to be opened or thrown back from the horn, and capable of being folded into the concave surface of the latter, substantially as and for the purpose herein set forth.

2. The combined tool consisting of a shoe-horn having its handle end contracted, and provided with flanges or projections, one or more buttoning devices hinged or pivoted to said projections, and a spring on the horn arranged to bear against the pivoted end of the buttoner and hold it to open or closed position, as explained.

JNO. S. BULKELEY.

Witnesses:
J. McDOWALL,
L. B. PUTNAM.